(12) United States Patent
Chen et al.

(10) Patent No.: US 8,672,420 B2
(45) Date of Patent: Mar. 18, 2014

(54) SYSTEM FOR EVACUATING GAS FROM A BRAKE BOOSTER

(75) Inventors: Jiun-Jie Chen, Lugong (TW); Shih-Chieh Huang, Changhua County (TW); Chien-Tzu Chen, Changhua County (TW); Yan-Sin Liao, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 138 days.

(21) Appl. No.: 13/292,840

(22) Filed: Nov. 9, 2011

(65) Prior Publication Data
US 2013/0081705 A1 Apr. 4, 2013

(51) Int. Cl.
*B60T 8/44* (2006.01)

(52) U.S. Cl.
USPC ............ 303/114.3; 303/116.3; 188/357

(58) Field of Classification Search
USPC ............ 303/12, 114.3, 116.3; 188/356, 357
See application file for complete search history.

(56) References Cited

U.S. PATENT DOCUMENTS

| | | | | |
|---|---|---|---|---|
| 2,095,833 A | * | 10/1937 | Rockwell | 188/357 |
| 2001/0011456 A1 | * | 8/2001 | Hagen et al. | 188/356 |
| 2010/0193311 A1 | * | 8/2010 | Calnek et al. | 188/357 |

* cited by examiner

*Primary Examiner* — Thomas J Williams
(74) *Attorney, Agent, or Firm* — Banner & Witcoff, Ltd.

(57) ABSTRACT

A system for evacuating gas from a brake booster of a motor vehicle includes: a first conduit adapted to be connected fluidly to the brake booster; an electric pump connected fluidly to the first conduit, and controllable to evacuate gas from the brake booster via the first conduit; a second conduit; an electric valve fluidly connecting the first and second conduits to each other; a mechanical pump connected fluidly to the second conduit, and adapted to be driven by a vehicle drive unit of the motor vehicle to evacuate gas from the brake booster via the first conduit, the electric valve, and the second conduit; and a control unit operatively associated with the electric pump and the electric valve, and configured to control operations of the electric pump and the electric valve according to a working state of the mechanical pump.

4 Claims, 8 Drawing Sheets

SYSTEM FOR EVACUATING GAS FROM A BRAKE BOOSTER

BACKGROUND OF THE INVENTION

1. Field of the Invention

The present invention relates to a system for use with a brake booster, more particularly to a system for evacuating gas from a brake booster of a motor vehicle having a vehicle drive unit.

2. Description of the Related Art

Referring to FIG. 1, a conventional system for evacuating gas from a brake booster 111 of an electric motor vehicle 11 includes a conduit 12 connected fluidly to the brake booster 111, an electric pump 13 connected fluidly to the conduit 12, and a mechanical pressure sensor 14 coupled to the conduit 12 for sensing pressure therein.

During braking, the electric pump 13 is activated to evacuate gas from the conduit 12 so as to reduce pressure in the conduit 12 when the pressure detected by the mechanical pressure sensor 14 is not below a predetermined threshold, thereby ensuring normal operation of the brake booster 111.

However, during malfunction of the electric pump 13, the driver of the electric motor vehicle 11 may not be able to brake the electric motor vehicle 11 due to lack of vacuum in the brake booster 111.

SUMMARY OF THE INVENTION

Therefore, an object of the present invention is to provide a system for evacuating gas from a brake booster of a motor vehicle that is capable of alleviating the aforesaid drawbacks of the prior art.

According to the present invention, a system for evacuating gas from a brake booster of a motor vehicle having a vehicle drive unit includes first and second conduits, an electric pump, an electric valve, a mechanical pump, and a control unit.

The first conduit is adapted to be connected fluidly to the brake booster. The electric pump is connected fluidly to the first conduit, and is controllable to evacuate gas from the brake booster via the first conduit. The electric valve fluidly connects the first and second conduits to each other. The mechanical pump is connected fluidly to the second conduit, and is adapted to be driven by the vehicle drive unit to evacuate gas from the brake booster via the first conduit, the electric valve, and the second conduit. The control unit is operatively associated with the electric pump and the electric valve, and is configured to control operations of the electric pump and the electric valve according to a working state of the mechanical pump.

Another object of the present invention is to provide a method of evacuating gas from a brake booster of a motor vehicle that is capable of alleviating the aforesaid drawbacks of the prior art.

According to the present invention, a method of evacuating gas from a brake booster of a motor vehicle having a vehicle drive unit includes the steps of: fluidly connecting a mechanical pump to the brake booster via a first conduit, a second conduit, and an electric valve fluidly connecting the first and second conduits, the first conduit being fluidly connected to the brake booster, the mechanical pump being fluidly connected to the second conduit; coupling the mechanical pump to the vehicle drive unit to evacuate gas from the brake booster when driven by the vehicle drive unit; and fluidly connecting an electric pump to the first conduit and selectively activating each of the electric valve and the electric pump according to a working state of the mechanical pump to evacuate gas from the brake booster.

Yet another object of the present invention is to provide a method of controlling evacuation of gas from a brake booster of a motor vehicle.

According to the present invention, there is provided a method of controlling evacuation of gas from a brake booster of a motor vehicle. The motor vehicle includes a vehicle drive unit; a mechanical pump fluidly connected to the brake booster via a first conduit, a second conduit, and an electric valve fluidly connecting the first and second conduits, the first conduit being fluidly connected to the brake booster, the mechanical pump being fluidly connected to the second conduit and being coupled to the vehicle drive unit to evacuate gas from the brake booster when driven by the vehicle drive unit; and an electric pump fluidly connected to the first conduit. The method uses a controller operatively associated with the electric pump and the electric valve, and includes configuring the controller to selectively activate the electric valve and the electric pump according to a working state of the mechanical pump to evacuate gas from the brake booster.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
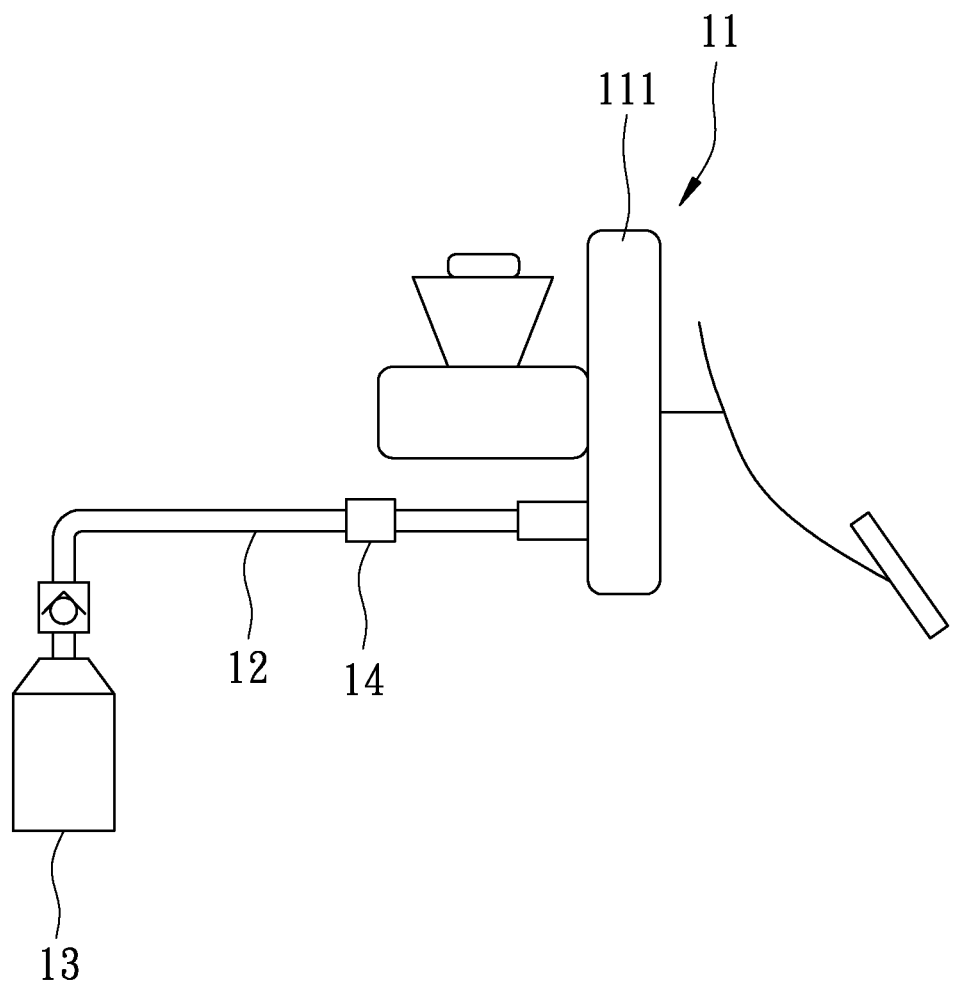
FIG. 1 is a schematic diagram to illustrate a conventional system for evacuating gas from a brake booster of a motor vehicle.
Figure 2:
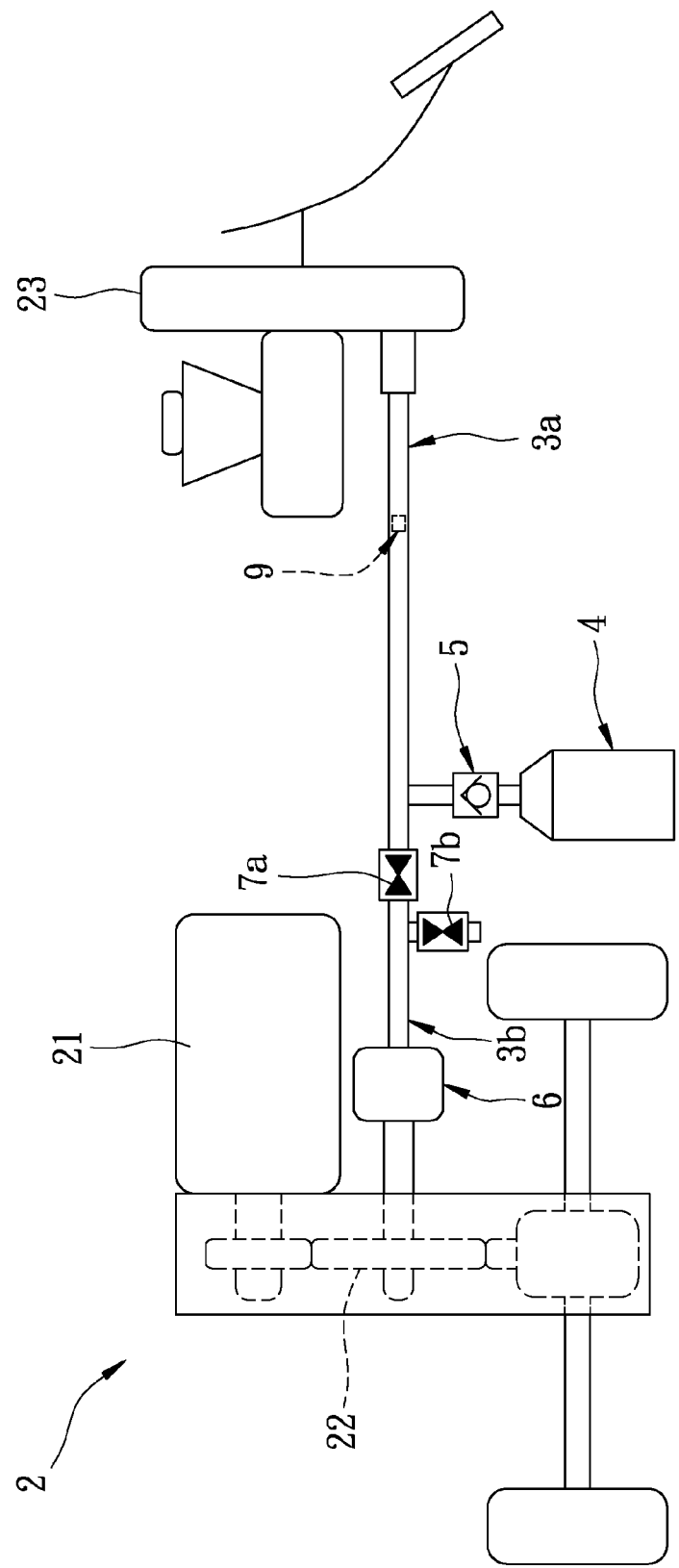
FIG. 2 is a schematic diagram to illustrate the preferred embodiment of a system for evacuating gas from a brake booster of a motor vehicle according to the present invention.
Figure 3:
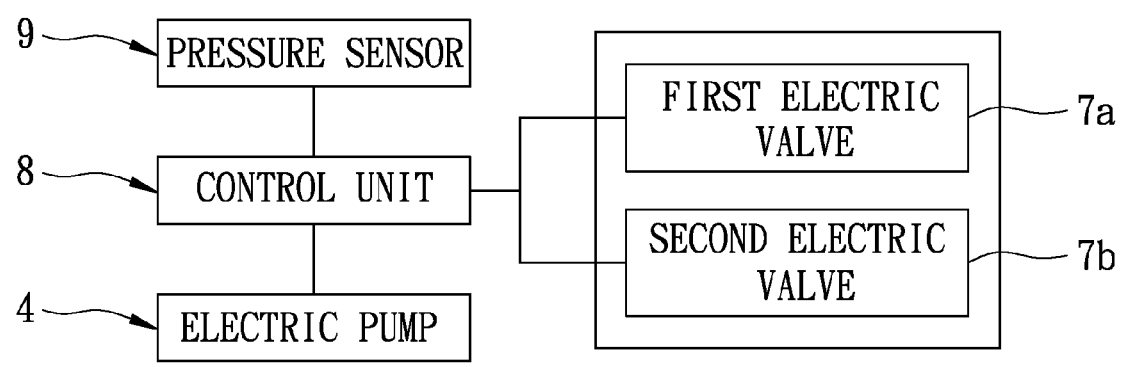
FIG. 3 is a block diagram to illustrate operative associations among controllable components of the system.

Referring to FIGS. 2 and 3, the preferred embodiment of a system for evacuating gas from a brake booster is applicable to a motor vehicle 2 (e.g., an electric motor vehicle) having a vehicle drive unit and a brake booster 23, and includes a first conduit 3a, a second conduit 3b, an electric pump 4, a unidirectional valve 5, a mechanical pump 6, a first electric valve 7a, a second electric valve 7b, a control unit 8, and a pressure sensor 9. The first conduit 3a is adapted to be connected fluidly to the brake booster 23. The electric pump 4 is connected fluidly to the first conduit 3a, and is controllable to evacuate gas from the brake booster 23 via the first conduit 3a. The first electric valve 7a fluidly connects the first and second conduits 3a, 3b to each other. The second electric valve 7b connects fluidly the second conduit 3b to an ambient environment. The mechanical pump 6 is connected fluidly to the second conduit 3b, and is adapted for coupling to and to be driven by the vehicle drive unit, which, in this embodiment, is a transmission system 22 of the motor vehicle 2 operatively associated with a motor 21 of the same, to evacuate gas from the brake booster 23 via the first conduit 3a, the first electric valve 7b, and the second conduit 3b. The pressure sensor 9 is coupled to the first conduit 3a and is operable to detect pressure therein. The control unit 8 is operatively associated with the electric pump 4, the first and second electric valves 7a, 7b, and the pressure sensor 9, and is configured to determine a working state of the mechanical pump 6 according to at least the pressure detected by the pressure sensor 9, and to subsequently control operations of each of the electric pump 4 and the first and second electric valves 7a, 7b based on the working state of the mechanical pump 6 determined thereby. In particular, a controller of the control unit 8 is configured to selectively activate each of the electric pump 4, and the first and second electric valves 7a, 7b based on the working state of the mechanical pump 6. In other embodiments, the control unit 8 may be adapted to receive external information indicative of the working state of the mechanical pump 6, and may be configured to determine the working state of the mechanical pump 6 according to the pressure detected by the pressure sensor 9 and the external information received thereby. However, configuration of the control unit 8 is not limited to such.

Figure 4:
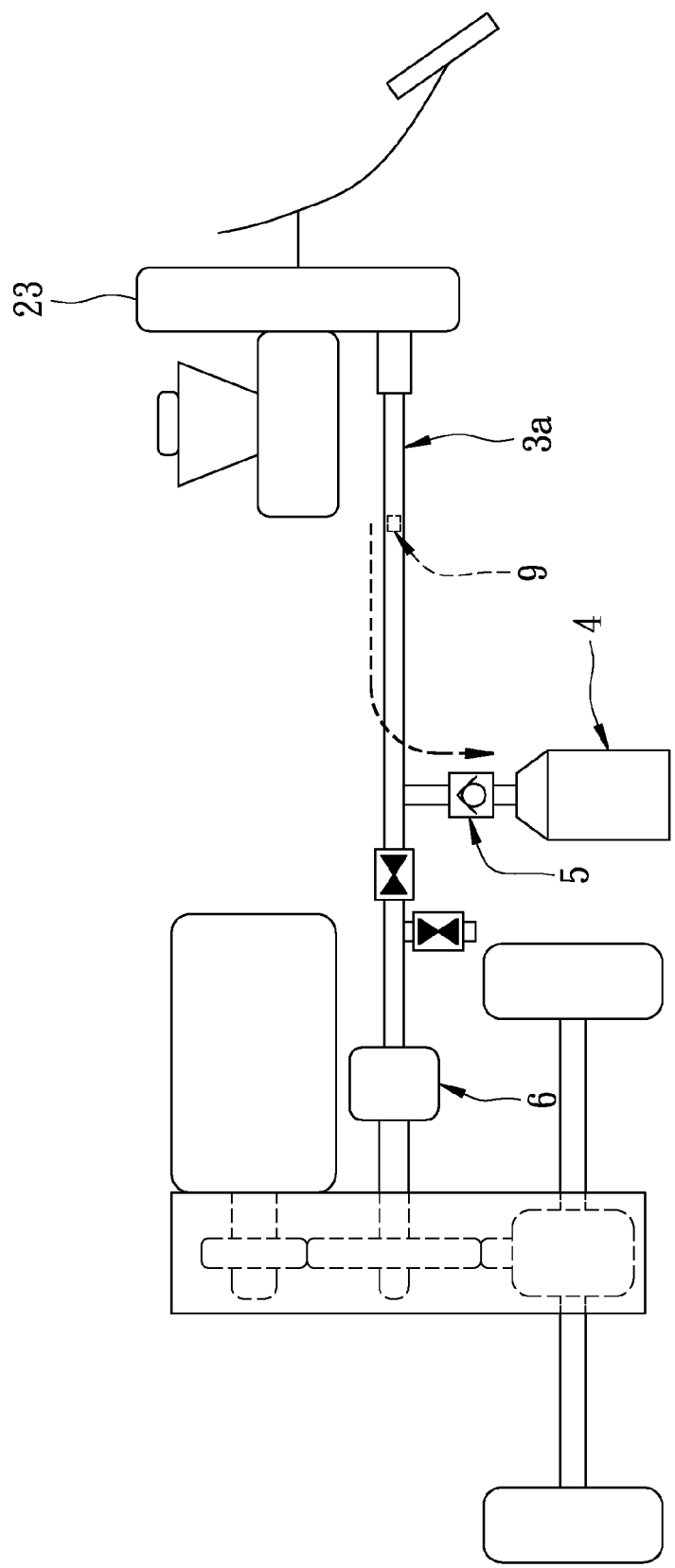
FIG. 4 is a schematic diagram to illustrate operation of the system when a mechanical pump of the system is in a non-operational state and when pressure detected by a pressure sensor of the system is not below a predetermined threshold.

When the control unit 8 determines that the mechanical pump 6 is in a non-operational state (e.g., the motor vehicle 2 is stationary, or the mechanical pump 6 is malfunctioning), in which the mechanical pump 6 is not being driven by the vehicle drive unit, the control unit 8 is configured to cause the first electric valve 7a to block fluid communication between the first and second conduits 3a, 3b therethrough, to activate the electric pump 4 if the pressure detected by the pressure sensor 9 is not below a predetermined threshold (see FIG. 4), and to deactivate the electric pump 4 if the pressure detected by the pressure sensor 9 is below the predetermined threshold.

In such a configuration, the electric pump 4 is activated to evacuate gas from the brake booster 23 via the first conduit 3a so as to reduce pressure in the first conduit 3a when the pressure detected by the pressure sensor 9 is not below the predetermined threshold. Moreover, the unidirectional valve 5 is arranged to permit flow of gas from the first conduit 3a to the electric pump 4 therethrough, and to block flow of gas from the electric pump 4 to the first conduit 3a therethrough.

Figure 5:
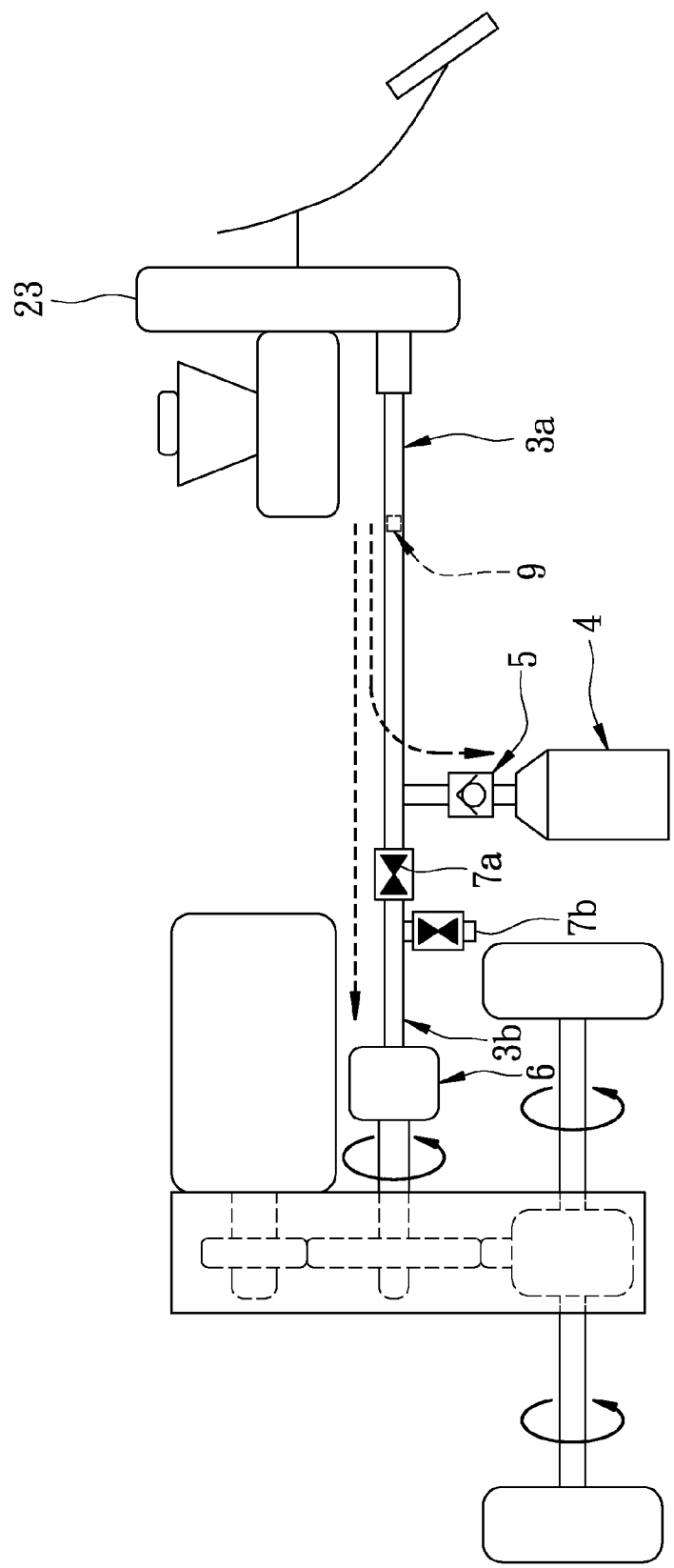
FIG. 5 is a schematic diagram to illustrate operation of the system when the mechanical pump is in an operational state, when the mechanical pump alone does not provide sufficient gas evacuation effect, and when pressure detected by the pressure sensor is not below the predetermined threshold.
Figure 6:
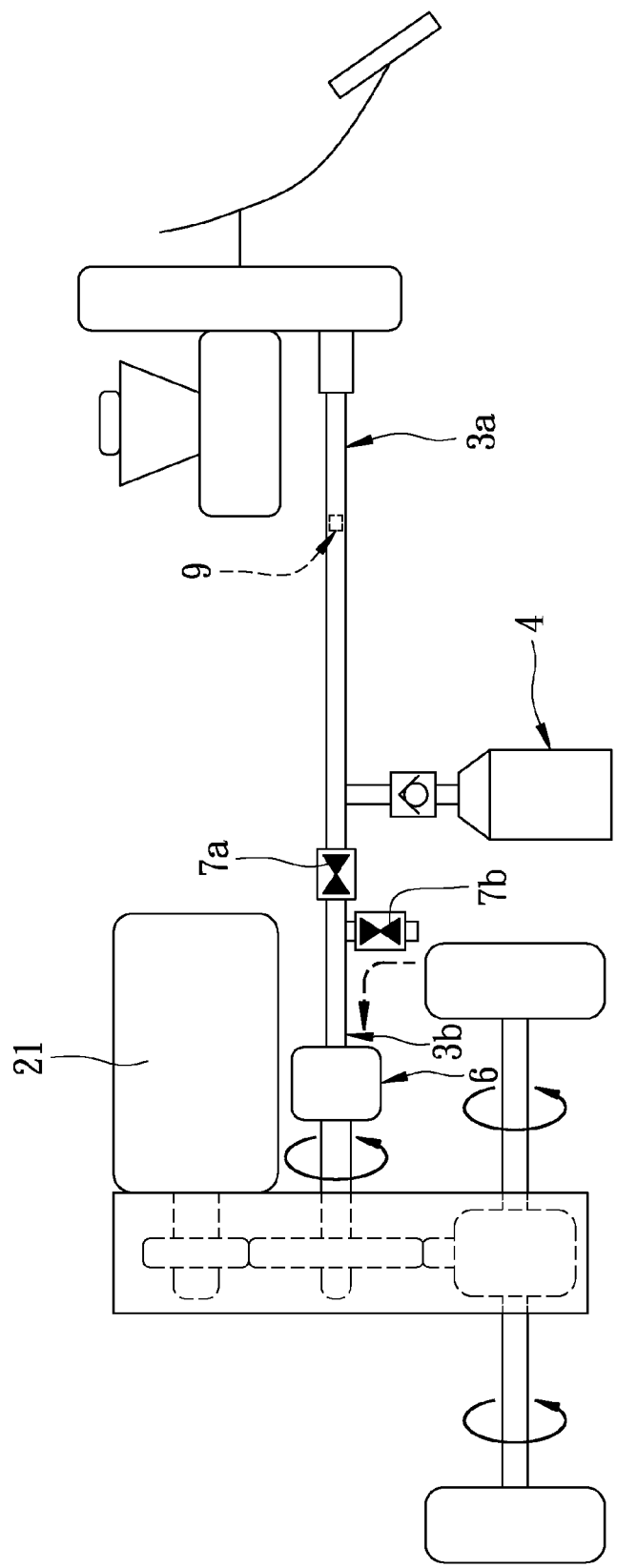
FIG. 6 is a schematic diagram to illustrate operation of the system when the mechanical pump is in the operational state and when pressure detected by the pressure sensor is below the predetermined threshold.

When the control unit 8 determines that the mechanical pump 6 is in an operational state, in which the mechanical pump 6 is being driven by the vehicle drive unit, and that the mechanical pump 6 alone does not provide sufficient gas evacuation effect (e.g., the motor vehicle 2 is traveling at low speed): the control unit 8 is configured to cause the first electric valve 7a to permit fluid communication between the first and second conduits 3a, 3b therethrough, to cause the second electric valve 7b to block fluid communication between the second conduit 3b and the ambient environment therethrough, and to activate the electric pump 4 if the pressure detected by the pressure sensor 9 is not below the predetermined threshold (see FIG. 5); and the control unit 8 is configured to cause the first electric valve 7a to block fluid communication between the first and second conduits 3a, 3b therethrough, to cause the second electric valve 7b to permit fluid communication between the second conduit 3b and the ambient environment therethrough, and to deactivate the electric pump 4 if the pressure detected by the pressure sensor 9 is below the predetermined threshold (see FIG. 6).

In such a configuration, the electric pump 4 evacuates gas from the brake booster 23 via the first conduit 3a, and the mechanical pump 6 evacuates gas from the brake booster 23 via the first conduit 3a, the first electric valve 7a, and the second conduit 3b, thereby reducing pressure in the first conduit 3a when the pressure detected by the pressure sensor 9 is not below the predetermined threshold. Moreover, when the first electric valve 7a is caused to block fluid communication between the first and second conduits 3a, 3b therethrough, the mechanical pump 6 is able to draw gas from the ambient environment via the second electric valve 7b and the second conduit 3b, which prevents loading on the mechanical pump 6 and hence that on the vehicle drive unit from increasing.

Figure 7:
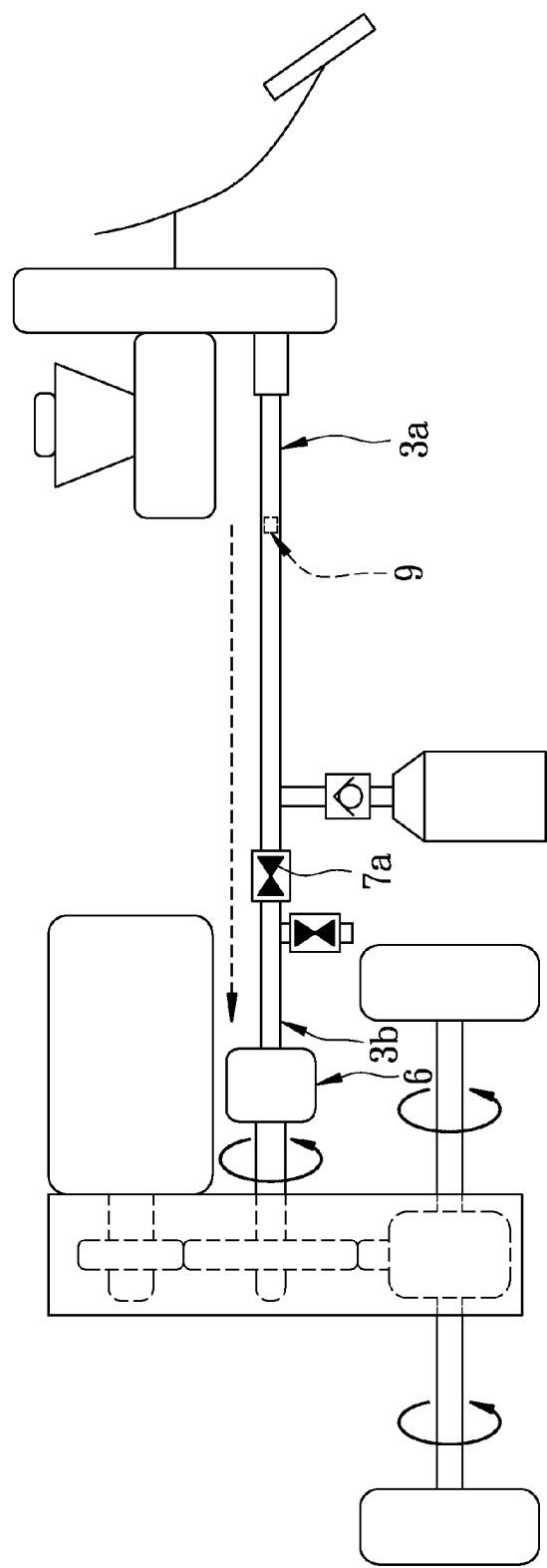
FIG. 7 is a schematic diagram to illustrate operation of the system when the mechanical pump is in the operational state, when the mechanical pump alone provides sufficient gas evacuation effect, and when pressure detected by the pressure sensor is not below the predetermined threshold.

It is to be noted that, when the control unit 8 determines that the mechanical pump 6 is in the operational state and that the mechanical pump 6 alone provides sufficient gas evacuation effect (e.g., the motor vehicle 2 is traveling at high speed), the control unit 8 may be configured to deactivate the electric pump 4 to thereby extend lifespan of the electric pump 4 (see FIG. 7).

Figure 8:
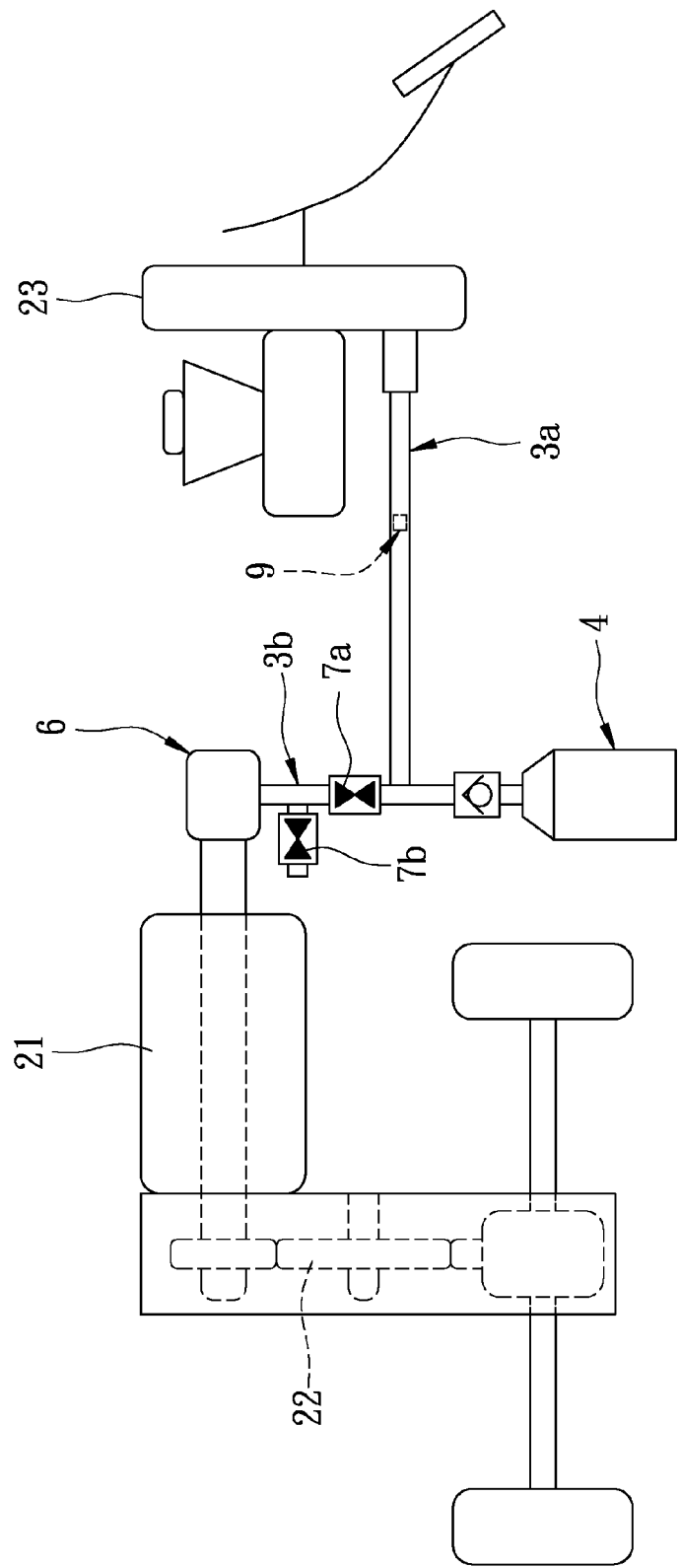
FIG. 8 is a schematic diagram to illustrate a modification of the system according to the present invention.

Referring to FIG. 8, in a modification, the vehicle drive unit to which the mechanical pump 6 is adapted for coupling and by which the mechanical pump 6 is adapted to be driven is the motor 21 instead of the transmission system 22. Since the feature of the invention does not reside in a specific coupling arrangement of the mechanical pump 6 for operative association with a particular drive unit, which should be readily appreciated by those skilled in the art, relevant descriptions pertaining thereto will not be described hereinafter for the sake of brevity.

Further, each of the first and second electric valves 7a, 7b is an electromagnetic valve in this embodiment, and may be otherwise in other embodiments.

In summary, the system for evacuating gas from a brake booster of a motor vehicle having a vehicle drive unit, according to the present invention, achieves gas evacuation through the use of different types of pumps, and is thus relatively reliable. Moreover, when the motor vehicle 2 is being braked, the mechanical pump 6 is driven by the excess kinetic energy of the motor vehicle 2.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A system for evacuating gas from a brake booster of a motor vehicle having a vehicle drive unit, said system comprising:
   a first conduit adapted to be connected fluidly to the brake booster;
   an electric pump connected fluidly to said first conduit, and controllable to evacuate gas from the brake booster via said first conduit;
   a second conduit;
   a first electric valve fluidly connecting said first and second conduits to each other;

a mechanical pump connected fluidly to said second conduit, and adapted to be driven by the vehicle drive unit to evacuate gas from the brake booster via said first conduit, said first electric valve, and said second conduit;

a control unit operatively associated with said electric pump and said first electric valve, and configured to control operations of said electric pump and said first electric valve according to a working state of said mechanical pump; and a pressure sensor operable to detect pressure in said first conduit, wherein said control unit is further operatively associated with said pressure sensor, and is configured to determine the working state of the mechanical pump according to at least the pressure detected by said pressure sensor;

wherein said control unit is configured to deactivate said electric pump if the pressure detected by said pressure sensor is below a predetermined threshold; and wherein said control unit is configured to cause said first electric valve to block fluid communication between said first and second conduits therethrough when one of a first condition, where said control unit control unit determines that said mechanical pump is in a non-operational state, and a second condition, where said control unit determines that said mechanical pump is in an operational state and that the pressure detected by said pressure sensor is below the predetermined threshold, is satisfied.

2. The system as claimed in claim 1, wherein said control unit is further configured to activate said electric pump if the pressure detected by said pressure sensor is not below a predetermined threshold.

3. The system as claimed in claim 1, further comprising a second electric valve connecting fluidly said second conduit to an ambient environment and operatively associated with said control unit, wherein said control unit is further configured to cause said second electric valve to permit fluid communication between said second conduit and the ambient environment therethrough when the second condition is satisfied.

4. The system as claimed in claim 3, wherein at least one of said first and second electric valves is an electromagnetic valve.

* * * * *